United States Patent
Van Overveld et al.

(10) Patent No.: US 6,738,497 B2
(45) Date of Patent: May 18, 2004

(54) METHOD, SYSTEM AND APPARATUS FOR IMAGE BLOCK MATCHING

(75) Inventors: Cornelius Wilhelmus Antonius Marie Van Overveld, Eindhoven (NL); Piotr Wilinski, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 596 days.

(21) Appl. No.: 09/850,348

(22) Filed: May 7, 2001

(65) Prior Publication Data

US 2002/0012452 A1 Jan. 31, 2002

(30) Foreign Application Priority Data

May 19, 2000 (EP) .......................................... 00201775

(51) Int. Cl.$^7$ ................................................. G06K 9/00
(52) U.S. Cl. .................... 382/107; 348/416.1; 348/700; 375/240.16
(58) Field of Search ................................ 382/232, 236, 382/238, 239, 217, 218, 243, 250, 251, 284; 348/394.1, 415.1, 416.1, 441, 446, 452, 699, 700; 375/240.12, 240.16; 702/150, 181

(56) References Cited

U.S. PATENT DOCUMENTS

| | | | | |
|---|---|---|---|---|
| 4,992,869 A | * | 2/1991 | Samad et al. ............... | 348/451 |
| 5,093,720 A | * | 3/1992 | Krause et al. ............... | 348/452 |
| 5,208,667 A | * | 5/1993 | Saunders ..................... | 348/452 |
| 5,561,475 A | * | 10/1996 | Jung ........................... | 348/699 |
| 5,729,302 A | * | 3/1998 | Yamauchi .................... | 348/699 |
| 5,909,251 A | * | 6/1999 | Guichard et al. ........... | 348/416.1 |
| 6,040,864 A | * | 3/2000 | Etoh ............................ | 375/240.16 |
| 6,275,617 B1 | * | 8/2001 | Kondo ......................... | 382/236 |
| 6,650,781 B2 | * | 11/2003 | Nakaya ........................ | 382/236 |

FOREIGN PATENT DOCUMENTS

EP   1 014 727 A2  * 12/2000  ............ H04N/7/30

OTHER PUBLICATIONS

Cheng et al., "Fast Blcok Matching Algorithms for Motion Estimation", IEEE 1996, pp. 2311–2314, The University of Hong Kong.*

Garnham et al., "Adaptive Feature–based Motion Analysis and its Application to Interframe coding", Image Processing and Its Applications, Jul. 4–6, 1995, pp. 31–35, University of Nottingham, UK.*

Tham J.Y. et al., "A Novel Unrestricted Center–Biased Diamond Search Algorithm for Block Motion Estimation" vol. 8, No. 4, Aug. 1998, pp. 369–377.

* cited by examiner

Primary Examiner—Jayanti K. Patel

(57) ABSTRACT

In block-based motion or depth estimation, a block is assigned a motion or depth value as a result of minimizing the matching error over a limited set (45) of candidate values (20, 21, 22, 23). When the chosen candidate value (23) is an extreme value of the set, it is impossible to predict how remote this value is from the real minimal matching error. To overcome this problem, the method and system for choosing an optimal candidate value choose a new candidate (30) beyond the extreme value (23). When this new candidate (30) then has the lowest matching error, additional new candidates are chosen until it no longer has. An apparatus for adapting a video signal (40) uses the chosen candidate values to create an enhanced version of the video signal (40).

10 Claims, 1 Drawing Sheet

METHOD, SYSTEM AND APPARATUS FOR IMAGE BLOCK MATCHING

The invention relates to a method of choosing an optimal candidate value to be used for matching a block from a first image with an area from a second image, the method comprising:

(a) making a set of candidate values for determining an area to be matched from the second image, (b) for each candidate value from the set, determining an area to be matched from the second image, based on said candidate value, matching the block from the first image with this area and calculating a matching error, and (c) choosing the optimal candidate value from the set based on the calculated matching errors.

The invention likewise relates to a system for choosing an optimal candidate value to be used for matching a block from a first image with an area from a second image, the system comprising:

a collector, which is arranged for making a set of candidate values for determining an area to be matched from the second image, a matcher, which is arranged for determining for each candidate value from the set based on said candidate value an area to be matched from the second image, matching the block from the first image with this area and calculating a matching area, and a selector, which is arranged for choosing the optimal candidate value from the set based on the calculated matching errors.

The invention furthermore relates to an apparatus for processing a video signal that comprises a variety of images.

A method of the type defined in the opening paragraph is known from international patent application published under number WO 99/40726 (PHN 17.017) by the same applicants. With block-based techniques for determining motion and depth in an image, the image is divided into a number of blocks, for example, rectangles of equal size. The image may then be compared with another image by matching the individual blocks in the other image.

Matching a block with a second image is effected by choosing a number of candidate values for the motion vector or the depth and then determining for each candidate value in how far the block corresponds to an area in the second image. The degree of deviation in this match may be calculated. This deviation is called the matching error that belongs to the candidate value. The optimal candidate value is the candidate value that has a relatively small matching error. Suitable candidate values are, inter alia, the depths or the motion vectors of adjacent blocks from the first image, because they are likely to have approximately the same characteristics as the present block. Since a block comprises pixels, the matching error may be determined on the basis of the corresponding pixels in the block from the first image and in the area in the second image. A mathematical technique such as determining the mean square error (MSE) is suitable for this purpose.

When the chosen optimal candidate value lies between the minimum and the maximum of the set, there may be determined how close this candidate value lies to the real optimal value. For this purpose, the distance is determined between the two candidate values whose matching errors lie closest to the matching error of the optimal candidate value. The real optimal value must now lie in the interval determined by these two candidate values. The size of this interval may now be used as a measure for the accuracy of the chosen optimal candidate value. The larger the interval, the greater the chance of the real optimal value being remote from the chosen optimal candidate value.

A disadvantage of the known method is that when the optimal candidate value is an extreme value of the set, it is impossible to find out how much the matching error of this value comes close to the real smallest matching error. It is then highly likely that the value of the real minimum matching error lies remote from this candidate value. As a result, the approximation of the depth or the motion is not optimal with this method.

It is an object of the invention to provide a method of the type defined in the opening paragraph, in which a better choice for the optimal candidate value is made.

This object is achieved with the method according to the invention in that, when the chosen optimal candidate value is an extreme value of the set, the following steps are executed:

(d) extending the set by a first candidate value outside the interval determined by a minimum and a maximum of the set, (e) determining, based on the first candidate value, an area to be matched from the second image, matching the block from the first image with this area and calculating a matching error, and (f) choosing the optimal candidate value from the extended set based on the calculated matching errors.

If the optimal candidate value chosen with step (f) is the first candidate value, it has a smaller matching value than the candidate value chosen with step (c). This provides a better choice for the optimal candidate value. Otherwise, the optimal candidate value chosen with step (f) will be the candidate value chosen with step (c), because all the other candidate values are less optimal than the candidate values chosen with step (c). This candidate value then has the smallest matching error. At the same time, the accuracy of this matching error can be determined. This also provides a better choice for the optimal candidate value.

In an embodiment of the method, steps (d), (e) and (f) are repeated each time with a next candidate value, as long as the chosen optimal candidate value is an extreme value from the extended set. This embodiment is advantageous in that now always an optimal candidate value is chosen whose accuracy can be determined and that checks need only be made whether the optimal candidate value is the same as the first value to decide whether the set is to be extended further.

In a further embodiment of the method the first candidate value is determined by mirroring the value of a candidate value from the set relative to the chosen optimal candidate value. This embodiment is advantageous in that it is very simple to obtain a new value in this manner.

In a further embodiment of the method the next candidate value is determined by mirroring the value of a candidate value from the extended set relative to the chosen optimal candidate value.

It is also an object of the invention to provide a system of the type defined in the opening paragraph in which a better choice for the optimal candidate value is made.

This object is achieved with the system according to the invention in that the system is arranged for detecting when the chosen optimal candidate value is an extreme value from the set, and in that the collector is arranged for extending the set in that case by a first candidate value outside the interval determined by a minimum and a maximum of the set, the matcher is arranged for determining, based on the first value, in that case an area to be matched from the second image, matching the block from the first image with this area and calculating a matching error, and the selector is arranged for choosing the optimal candidate value in that case from the extended set based on the calculated matching errors.

In an embodiment of the system the collector is arranged for extending the extended set further by a next candidate value determined outside the interval by a minimum and a maximum of the extended set as long as the optimal candidate value is an extreme value of the extended set, the matcher is arranged for determining in that case an area to be matched from the second image on the basis of the next candidate value, matching the block from the first image with this area and calculating a matching error, and the selector is arranged for choosing in that case the optimal candidate value from the extended set based on the calculated matching errors.

This embodiment is advantageous in that it is easy to realize because the system now only needs to check whether the optimal candidate value is the same as the first value, to decide whether the set is to be extended any further.

In a further embodiment of the system, the collector is arranged for determining the first candidate value by mirroring the value of a candidate value from the set relative to the optimal candidate value. This embodiment is advantageous in that now new candidate values may be found in a manner that is fast and easy to implement.

In a further embodiment of the system, the collector is arranged for determining the next candidate value by mirroring the value of a candidate value from the extended set relative to the chosen optimal candidate value.

It is also an object of the invention to provide an apparatus defined in the introductory part by which the video signal is processed in a better manner.

This object is achieved with the apparatus in accordance with the invention, in that the apparatus comprises:

a system according to the invention for choosing an optimal candidate value to be used for matching a block from a first image with an area from a second image, the system being arranged for choosing optimal candidate values for blocks from the images from said variety, and an image processor for processing the video signal to obtain an enhanced video signal based on the obtained optimal candidate values as determined by said system.

The image processor enhances the image on the basis of the optimal candidate value that is chosen by a system in accordance with the invention. Since a better choice of the optimal candidate value is made with this system, this will lead to an enhanced image that is improved with respect to other apparatus.

In one embodiment the apparatus further includes a display system for displaying an enhanced video signal.

These and other aspects of the invention are apparent from and will be elucidated with reference to the embodiment(s) described hereinafter.

Figure 1:
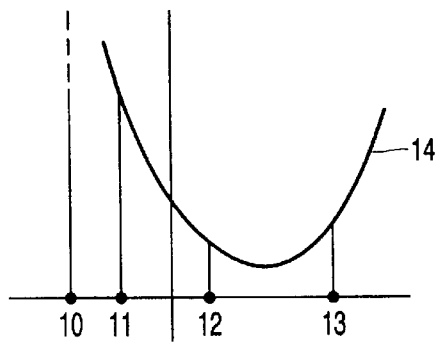
FIG. 1 is a diagrammatic representation of a number of candidate values and their matching errors.

In block-based techniques for determining motion and depth in a first image, the image is subdivided into a number of blocks. These blocks may be rectangular and of equal size, so that the subdivision may be effected in a simple and fast manner, although it is alternatively possible to utilize arbitrary other shapes. The use of non-rectangular blocks is advantageous in that now arbitrary objects may be covered by a group of blocks, so that motion or depth of such an object can be determined. By subdividing the image into blocks, it is now possible to compare the image with a second image by matching the blocks from the first image with an area from the second image. If the blocks are chosen sufficiently small, there may be assumed that each block moves uniformly and that the depth in a block is the same everywhere. It is then possible to look for an area from the second image that corresponds to a block from the first image. If this is found, the shift of this block in between the two images may be determined and thus the motion of this block. If the two images both relate to a still object, this provides the information that is necessary for determining the depth of this object.

Rarely will it happen that a block from the first image fully matches an area from the second image. This problem is solved by determining, on the basis of the candidate value for the depth or for the motion vector, where the block from the first image would have to be situated in the second image. Subsequently, the area from the second image corresponding to this is matched with the first block and the degree of deviation of the match may be calculated. This deviation is called the matching error of the candidate value. The optimal candidate value is the candidate value having a relatively small matching error, preferably the smallest matching error.

Since a block consists of pixels, the matching error may be determined on the basis of the corresponding pixels in the two blocks. A mathematical technique such as determining the mean square error (MSE) is suitable for this purpose. With this technique the matching error for a motion vector (dx, dy) can be calculated as follows:

$$MSE(i, j) = \sum_{m=1}^{M} \sum_{n=1}^{N} [U_1(m, n) - U_0(m + dx, n + dy)]^2$$

Herein M and N are the dimensions of the block in pixels and $U_i(m, n)$ is the pixel intensity in image i at location (m, n). Calculating the matching error for a depth d takes place in similar manner.

Another suitable mathematical technique is calculating the sum of absolute differences (SAD). The matching error for a depth d may be calculated herewith as follows:

$$SAD(d) = \sum_{(x,y) \in B} |U_1(x + \Delta x(d), y + \Delta y(d)) - U_0(x, y)|$$

Herein, (x, y) is a pixel in a block B and $\Delta x(d)$ is the change of x based on the candidate value for the depth d.

In addition to the mean square error and the sum of absolute differences, also other mathematical techniques, such as the mean absolute difference or the sum of square errors may be used for calculating the matching error of a candidate value for the depth or for a motion vector.

For practical reasons, inter alia, because there is only little time to process a separate image during video signal processing, usually a set of a limited number of candidate values is made, which are subsequently used, as described above, for determining an area from the second image, after which the block from the first image is matched therewith. It is common practice that the values for the depth or the found motion vector of adjacent other blocks are chosen, possibly added by a random value or a previously calculated value for the depth or the motion vector for this block. After the matching errors of the elements of the set have been calculated, the optimal candidate value is chosen as the candidate value having the smallest matching error.

The steps of making the set, calculating the matching errors of the elements of this set and choosing the optimal candidate value may be executed as three separate steps, but also in combination. For each chosen candidate value the matching error may be calculated directly, for example, after which this matching error can be compared with a "running minimum". If a matching error that has just been calculated turns out to be smaller than this running minimum, the current candidate value is chosen as a provisional optimal candidate value and its matching error as a new running minimum. After all the candidate values in the set have been chosen, the thus determined provisional optimal candidate value now becomes the real optimal candidate value.

The method described above may be repeated a number of times to come to the best possible choice of the optimal candidate value. In the case where the depth in the image is determined, initially the depths are chosen at random. With each repetition the values of adjacent blocks are used then, which values may be different from the values of the previous repetition. The newly found value having the smallest matching error is subsequently used for calculating the matching error of other blocks. When the values no longer change, the final value is determined and repetitions may be stopped. With each repetition, the current value for the optimal candidate value and the matching error are to be saved for each block.

FIG. 1 shows a graph in which the matching error is plotted as a function of the candidate value for a block depth. On the x-axis there are a number of candidate values 10, 11, 12 and 13 with their matching errors in a curve 14. The real minimal matching error lies in the curve 14 between candidate values 12 and 13. Candidate value 12 may now be chosen as the optimal value because it has the lowest matching error of all the candidate values 10, 11, 12 and 13.

Figure 2:
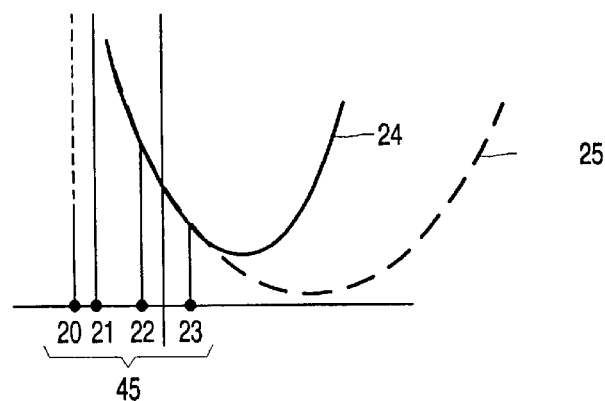
FIG. 2 is a diagrammatic representation of the situation in which the optimal candidate value is an extreme value of the set.

FIG. 2 shows a second graph in which the matching error is plotted as a function of the depth candidate value. On the x-axis of the graph there are a number of candidate values 20, 21, 22 and 23 with their matching errors in a curve 24. The real minimal matching error in this graph lies beyond candidate value 23. According to the known method, candidate value 23 is now chosen to be the optimal candidate value, because it has the lowest attendant error of all the candidate values 20, 21, 22 and 23 from the set 45.

However, it is alternatively possible that the function follows the curve 25. In this case the real minimal matching error lies remote from the chosen optimal value. The known method, however, does not offer a possibility of determining whether the chosen candidate values 20, 21, 22 and 23 relate to the curve 24 or curve 25.

In the method according to the invention a check is made whether the found optimal candidate value is an extreme value of the set. In the chosen set 45, which is represented in FIG. 2, the following is the case: candidate value 23 is a maximum of the set 45.

When the graph relates to candidate values for the depth, the smallest and largest values for the depth are the extreme values of the set. With candidate values for motion vectors, each candidate value is a vector having components for the horizontal and vertical motion. In that case, a candidate value for the motion vector is a maximum value of the set if one of the components of this vector exceeds the corresponding components of the other vectors. A candidate value for the motion vector having the smallest horizontal component compared to the horizontal components of all the candidate values from the set is then a minimum value of the set.

Figure 3:
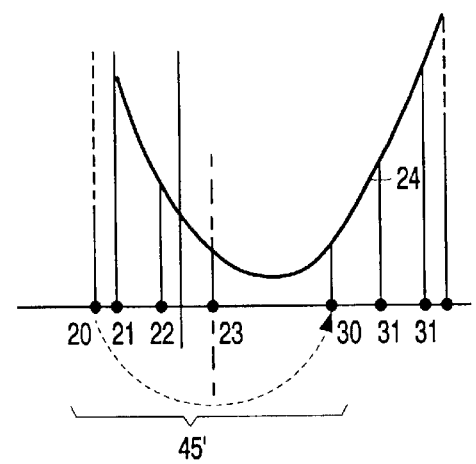
FIG. 3 is a diagrammatic representation of the situation in which the set is extended by a first value.

If the chosen optimal candidate value is an extreme value of the set, the set is extended by a first candidate value lying outside the interval determined by a minimum 20 and a maximum 23 of the set 45. The result of this is shown in FIG. 3. A first candidate value 30 is chosen that exceeds the candidate value 23, the maximum. It may be clear that if the optimal candidate value 23 were a minimum of the set 45, the set 45 would be extended by a first value that was smaller than the candidate value 23. The set 45 is now extended by this first candidate value 30 into the extended set 45'.

Based on the first candidate value 30, an area to be matched from the second image is determined. The block from the first image is matched with this area and the matching error is calculated. The optimal candidate value is then chosen from the extended set 45', containing the candidate values 20, 21, 22, 23 and 30. In the graph of FIG. 3 the first candidate value 30 is now chosen as an optimal candidate value, because the matching error of the first candidate value 30 is minimal. In this situation a further enhancement is possible by further extending the extended set 45' in similar manner by a next candidate value 31, 32, . . . Based on this next candidate value 31, 32, . . . , an area to be matched from the second image is determined, after which the block from the first image is matched with this area and a matching error is calculated. The optimal candidate value is then chosen from the extended set 45', containing the candidate values 20, 21, 22, 23, 30, 31, 32, . . . , based on the calculated matching errors. Since the curve 24 has a minimum, the set will eventually always be extended by a next value 31, 32, . . . in this manner, whose matching error is larger than the matching error of the chosen optimal candidate value. This optimal candidate value then has the lowest matching error and is not an extreme value of the set.

The first candidate value 30 may preferably be determined by mirroring the value of an element from the set 45 relative to the optimal candidate value. In FIG. 3 the distance between the first candidate value 30 and the extreme value 23 equals the distance between the candidate value 20 and the extreme value 23. Although, obviously, all the candidate values 20, 21 and 22 can be used in this manner to determine the first candidate value 30, it is to be preferred to use the other extreme value. In the graph of FIG. 3 this is candidate value 20, a maximum of the curve 24. Also the other candidate values 31, 32, . . . can be used in this manner.

Figure 4:
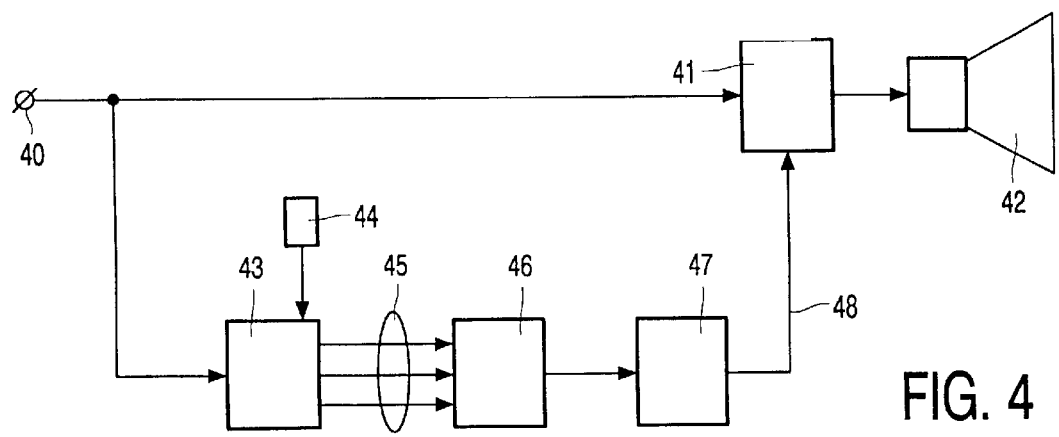
FIG. 4 is a diagrammatic representation of an apparatus according to the invention for processing an image.

FIG. 4 represents an apparatus for processing a video signal 40, which video signal 40 comprises a variety of images. The apparatus comprises an image processor 41, which is arranged for processing the video signal 40 to obtain an enhanced video signal. This enhanced video signal is then displayed on a display screen 42. Although FIG. 4 shows the display screen 42 as part of the same apparatus that includes the image processor 41, it may be clear that the display screen 42 may also be arranged independently of the apparatus and can receive the enhanced video signal from the apparatus via a network.

The image processor 41 can enhance the video signal 40 based on information about the motion or depth of individual images in the video signal 40. For example, it is possible for the image processor 41 to process the video signal 40, so that a user can watch the image from another angle by separately rotating, based on depth information, individual objects determined by a group of blocks, and thus generating a correct reproduction from another angle. This may provide, for example, a stereoscopic reproduction. Motion information may be used for detecting and marking moving objects, for example, to be used for automatic surveillance cameras. The thus obtained video signal with marked objects provides an enhancement for the user of these cameras, because they can now detect the image changes much faster.

In another possible application the image processor 41 enhances the video signal 40 which is offered, for example, in a compressed format such as MPEG, by producing a video signal that is compressed more efficiently. An individual object determined via a group of blocks, which object occurs in a number of images in the video signal 40, may now be compressed by storing pixel information about the object once-only and storing only the motion vector or depth information of this object for other images this object occurs in. Since this information requires less storage capacity than the pixel information of the complete object, a method such as this one can provide a considerably enhanced compressed video signal.

For clarity, the explanation below is about the function of elements of the system only when a first block depth is determined, but it may be clear from the above that the movement of a first block can be determined in similar manner.

The apparatus further includes a collector 43, a matcher 46 and a selector 47. The collector 43 is arranged for making a set 45 of candidate values for determining an area to be matched from the second image. The set 45 made by the collector 43 includes, inter alia, previously determined depths of blocks adjacent to the first block. The depths of adjacent blocks will generally show little mutual difference. The depths of blocks adjacent to the first block therefore form a good starting point for determining the depth of the first block and are therefore used as candidate values for this depth. To this end there is a storage system 44 on which this depth and other previously determined depths can be stored, so that the collector 43 can use them when making the set 45 of candidate values.

The collector 43 sends the set 45 of candidate values on to a matcher 46. The matcher 46 determines for each candidate value from the set, on the basis of said candidate value, an area to be matched from the second image. Subsequently, the matcher 46 matches the block from the first image with this area and the matcher 46 calculates an associated matching area, as is described above. For this purpose, methods mentioned earlier may be implemented, such as the mean square error, the mean absolute difference, the sum of absolute differences or the sum of square errors.

After the matching errors of the candidate values from the set 45 have been calculated, a selector 47 chooses the optimal candidate value 48 from the set 45 on the basis of the calculated matching errors. The optimal candidate value 48 is the candidate value having a relatively low matching error. The selector 47 then sends the optimal candidate value 48 to the image processor 41. Repeating this procedure for various blocks from an image provides depth information for this image. Based on the thus provided depth information, the image processor 41 can process the video signal 40 to obtain an enhanced video signal. This enhanced video signal may then be displayed on the display screen 42.

It may happen that the optimal candidate value 48 is an extreme value of the set 45. A collector is arranged for extending the set 45 in that case by a first value outside the interval determined by a minimum and a maximum of the set 45. The matcher 46 then determines, based on the first value, an area to be matched from the second image and matches the block from the first image with this area. The matcher 46 then calculates the attendant matching error and the selector 47 then chooses the optimal candidate value from the extended set based on the calculated matching errors.

The system is preferably arranged so that the collector 43 is arranged for further extending the extended set 45' by a next candidate value 31, 32, . . . outside the interval determined by a minimum and a maximum of the extended set 45' as long as the optimal candidate value 48 is an extreme value of the extended set 45'. The matcher 46 is then arranged for determining, based on the next candidate value 31, 32, . . . , an area to be matched from the second image, matching the block from the first image with this area from the second image and calculating a matching error. The selector 47 is then arranged for choosing the optimal candidate value 48 from the extended set 45' based on the calculated matching errors 24.

The collector may also be arranged for determining the first candidate value 30 by mirroring the value of a candidate value from the set 45 relative to the optimal candidate value 48 and for determining the next candidate value 31, 32, . . . by mirroring the value of a candidate value from the extended set 45' relative to the optimal candidate value 48.

What is claimed is:

1. A method of choosing an optimal candidate value to be used for matching a block from a first image with an area from a second image, the method comprising:

(a) making a set (45) of candidate values (20, 21, 22, 23) for determining an area to be matched from the second image, (b) for each candidate value from the set (45), determining an area to be matched from the second image, based on said candidate value, matching the block from the first image with this area and calculating a matching error, and (c) choosing the optimal candidate value from the set (45) based on the calculated matching errors (24), characterized in that, when the chosen optimal candidate value is an extreme value of the set (45), the following steps are executed, (d) extending the set (45) by a first candidate value (30) outside the interval determined by a minimum (20) and a maximum (23) of the set (45), (e) determining, based on the first candidate value (30), an area to be matched from the second image, matching the block from the first image with this area and calculating a matching error, and (f) choosing the optimal candidate value from the extended set (45') based on the calculated matching errors (24).

2. A method as claimed in claim 1, characterized in that steps (d), (e) and (f) are repeated each time with a next candidate value (31, 32, . . . ) as long as the chosen optimal candidate value is an extreme value from the extended set (45').

3. A method as claimed in claim 1, characterized in that the first candidate value (30) is determined by mirroring the value of a candidate value from the set (45) relative to the chosen optimal candidate value.

4. A method as claimed in claim 2, characterized in that the next candidate value (31, 32, . . . ) is determined by mirroring the value of a candidate value from the extended set (45') relative to the chosen optimal candidate value.

5. A system for choosing an optimal candidate value to be used for matching a block from a first image with an area from a second image, the system comprising:

a collector (43), which is arranged for making a set (45) of candidate values (20, 21, 22, 23) for determining an area to be matched from the second image, a matcher (46), which is arranged for determining for each candidate value from the set based on said candidate value an area to be matched from the second image, matching the block from the first image with this area and calculating a matching area, and a selector (47), which is arranged for choosing the optimal candidate value from the set (45) based on the calculated matching errors (24), characterized in that the system is arranged for detecting when the chosen optimal candidate value is an extreme value from the set (45), and in that the collector (43) is arranged for extending the set (45) in that case by a first candidate value (30) outside the interval determined by a minimum (20) and a maximum (23) of the set (45), the matcher (46) is arranged for determining, based on the first value (30), in that case an area to be matched from the second image, matching the block from the first image with this area and calculating a matching error, and the selector (47) is arranged for choosing the optimal candidate value in that case from the extended set (45') based on the calculated matching errors (24).

6. A system as claimed in claim 5, characterized in that the collector (43) is arranged for extending the extended set (45') further by a next candidate value (31, 32, . . .) determined outside the interval by a minimum and a maximum of the extended set (45') as long as the optimal candidate value is an extreme value of the extended set (45'), the matcher (46) is arranged for determining in that case an area to be matched from the second image on the basis of the next candidate value (31, 32, . . .), matching the block from the first image with this area and calculating a matching error, and the selector (47) is arranged for choosing in that case the optimal candidate value from the extended set (45') based on the calculated matching errors (24).

7. A system as claimed in claim 5, characterized in that the collector (43) is arranged for determining the first candidate value (30) by mirroring the value of a candidate value from the set (45) relative to the optimal candidate value.

8. A system as claimed in claim 5, characterized in that the collector (43) is arranged for determining the next candidate value (31, 32, . . .) by mirroring the value of a candidate value from the extended set (45') relative to the chosen optimal candidate value.

9. An apparatus for processing a video signal (40) that comprises a variety of images, including:

a system (43, 46, 47) as claimed in claim 5, 6, 7 or 8 for choosing an optimal candidate value (48) to be used for matching a block from a first image (40) with an area from a second image, the system being arranged for choosing optimal candidate values for blocks from the images from said variety, and an image processor (41) for processing the video signal (40) to obtain an enhanced video signal based on the obtained optimal candidate values as determined by said system (43, 46, 47).

10. An apparatus as claimed in claim 9, characterized in that the apparatus further includes a display system (42) for displaying the enhanced video signal.

* * * * *